Jan. 6, 1925.
A. E. FORSETH
ICE CREAM DISPENSER
Filed Aug. 3, 1921
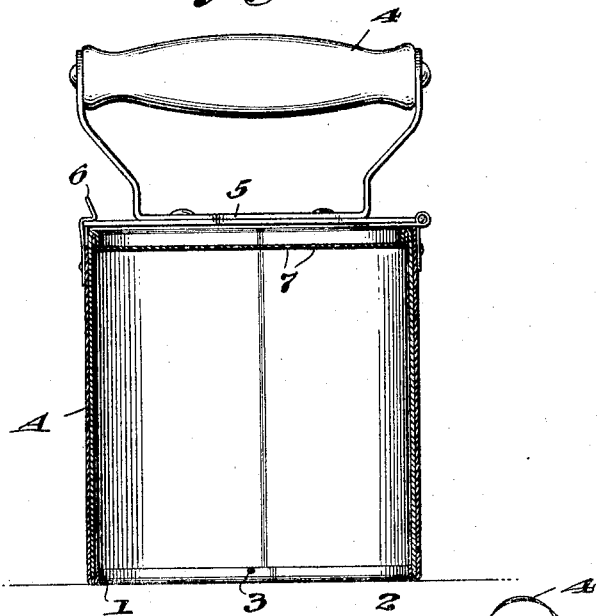
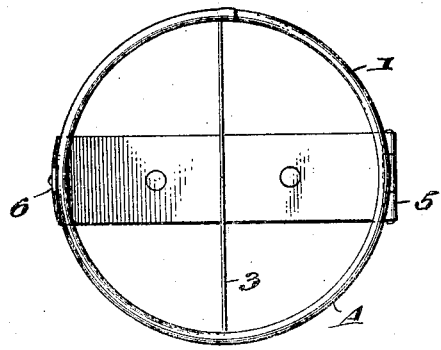
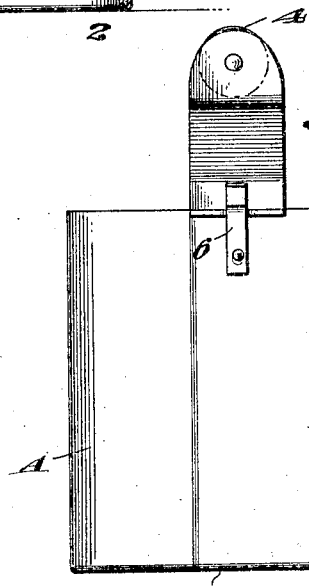
INVENTOR.
Alfred E. Forseth
BY
his ATTORNEYS Patented Jan. 6, 1925.

1,522,434

UNITED STATES PATENT OFFICE.

ALFRED E. FORSETH, OF HARDWICK, MINNESOTA.

ICE-CREAM DISPENSER.

Application filed August 3, 1921. Serial No. 489,504.

*To all whom it may concern:*

Be it known that I, ALFRED E. FORSETH, residing at Hardwick, county of Rock, and State of Minnesota, a citizen of the United States, have invented certain new and useful Improvements in Ice-Cream Dispensers, of which the following is a specification.

My invention relates to an improvement in ice cream dispensers.

The object of this invention is to provide a device of the character named, of such construction that no separate receptacle is required into which the cream is to be placed, the cream to be dispensed being dipped from the freezer directly into the container thus saving one operation and one handling of the cream which means less time and expense, less melting of the cream, and in short, the sanitary handling of the ice cream.

This invention consists of a metal loader constructed and adapted to receive a container which latter is filled with the cream by inserting the loader into the main body of cream and a handle detachably connected with the loader and means for cutting the cream in the loader from the remaining cream in the freezer or other receptacle.

In the accompanying drawings,

Figure 1 is a vertical sectional view,

Figure 2 is a bottom plan view, and

Figure 3 is a side elevation looking toward one end of the handle.

A, represents the loader which is preferably of cylindrical form and may be made in different sizes, such as pints, quarts or other measured size to suit the requirements.

The inner end is turned back in the form of a protecting flange 1. This is to protect the open edge of the container 2, the container being of a size to fit within the loader and have its open edge surrounded and protected by the flange at the cutting edge of the loader.

The wire 3, extends across the open end of the loader for cutting the cream in the container from the receptacle from which the cream is removed.

The outer end of the loader is provided with a handle 4, which is preferably connected thereto by hinge 5, at one end which permits it to be swung aside and a spring latch 6, at the other end to fasten the handle in place when in operation.

When thus fastened the handle is not only rigidly secured to the loader, but also it holds the container securely placed between it and the flanged cutting edge of the loader.

The bottom of the container has vents 7, for the escape of air when filled.

In operation the handle is unlatched and swung aside, the container is inserted in the loader, the handle is then latched in place, grasped in the operator's hand and the open end of the loader is pushed into the cream with sufficient pressure to fill the container whereupon to cut the portion in the container from the main body of cream the device is given a half turn and then withdrawn. The handle is then released and device is inverted to let the container with its cream slide out through the back end of the loader after which the handle is replaced over the container. The foregoing operation is repeated each time a container is to be filled and in this way the cream is ready for the customer with the least amount of handling and in the shortest possible space of time.

It is obvious that any other means may be employed to cut the ice cream, in lieu of the wire cutter shown.

I claim,

1. An ice cream dispenser including a cylindrical loader made of a single piece of material having an integral flange at the cutting edge, a handle hinged to the outer end of the loader and adapted to hold a container in the loader securely between the handle and the flange, a latch for fastening the handle in the closed position, and a wire across the cutting end of the loader for severing the cream in the container from the main body of cream, the loader being adapted for insertion into the cream whereby to fill the container, and the container removable from the loader in the same direction in which the cream entered the container.

2. An ice cream dispenser including a loader having an integral flange at the cutting edge, a container adapted to be fitted to the loader with one edge within and protected by the flange, a handle hinged to the other end of the loader and adapted when in place to hold the container in the loader securely between the handle and the flange, and means for fastening the handle in this closed position.

3. An ice cream dispenser including a loader having a flanged cutting edge, a container adapted to be fitted to the loader with one edge protected by the integral flange, a handle hinged to the other end of the loader and adapted when in place to hold the container in the loader securely between the handle and the flange, means for fastening the handle in this closed position, and a wire across the cutting end of the loader for severing the cream in the container from the main body of cream.

4. An ice cream dispenser including a cylindrical loader having an integral flange at one end and a removable closure at the opposite end, for holding a container between the integral flange and the removable closure, the loader being adapted for insertion into the cream whereby to fill the container and the container removable from the loader in the some direction in which the cream entered the container.

In testimony whereof I hereunto affix my signature.

ALFRED E. FORSETH.